(12) United States Patent
Kulovesi et al.

(10) Patent No.: US 11,657,648 B2
(45) Date of Patent: May 23, 2023

(54) METHOD AND SYSTEM FOR MEASURING A FEATURE OF PERSONS

(71) Applicant: Revieve Oy, Helsinki (FI)

(72) Inventors: Jakke Kulovesi, Helsinki (FI); Joonas Hamunen, Helsinki (FI); Samuli Siivinen, Valencia (ES)

(73) Assignee: Revieve Oy, Helsinki (FI)

( * ) Notice: Subject to any disclaimer, the term of this patent is extended or adjusted under 35 U.S.C. 154(b) by 129 days.

(21) Appl. No.: 17/218,632

(22) Filed: Mar. 31, 2021

(65) Prior Publication Data

US 2022/0318542 A1 Oct. 6, 2022

(51) Int. Cl.
*G06V 40/16* (2022.01)

(52) U.S. Cl.
CPC .......... *G06V 40/165* (2022.01); *G06V 40/167* (2022.01); *G06V 40/178* (2022.01)

(58) Field of Classification Search
CPC .. G06V 40/165; G06V 40/167; G06V 40/178; G06V 40/168; G06V 10/25; G06V 10/40; G06V 10/454; G06V 10/772; G06V 10/774; G06V 10/776; G06V 10/82; G06V 20/54; G06V 2201/03; G06V 40/10; G06F 7/544; G06K 17/00; G06K 19/06018; G06K 19/06037; G06K 9/00; G06K 9/6267; G06K 9/6282; G06K 9/6285; G06T 2207/20084; G06T 7/136; G06T 1/0021; G06T 17/00; G06T 2207/10088; G06T 2207/20081; G06T 5/006; G06T 5/40; G06T 7/73; G06T 7/80; G06T 17/05; G06T 19/00; G06T 19/20; G06T 2200/08; G06T 2207/10072; G06T 2207/20216; G06T 2207/30004; G06T 7/0014; G06T 7/0016; G06T 7/12; G06T 7/155; G06T 7/337; G06T 7/60; G06N 20/10; G06N 3/08; G06N 20/00; G06N 20/20; G06N 3/02; G06N 3/006; G06N 3/04; G06N 7/005; G06N 3/0481
See application file for complete search history.

(56) References Cited

U.S. PATENT DOCUMENTS

| | | | |
|---|---|---|---|
| 2012/0114238 | A1 | 5/2012 | Park |
| 2019/0347469 | A1* | 11/2019 | Parkkinen ............ G06V 40/165 |
| 2021/0382970 | A1* | 12/2021 | Odinokikh ........... G06N 3/0454 |
| 2022/0061659 | A1* | 3/2022 | Kulovesi ................ G06V 40/18 |

FOREIGN PATENT DOCUMENTS

| | | |
|---|---|---|
| CN | 110647843 A | 1/2020 |
| CN | 111582223 A | 8/2020 |

OTHER PUBLICATIONS

European Patent Office, Extended European Search Report, Application No. 22152654.4, dated Jul. 6, 2022, 7 pages.

* cited by examiner

*Primary Examiner* — Nimesh Patel
(74) *Attorney, Agent, or Firm* — Ziegler IP Law Group, LLC

(57) ABSTRACT

A method and a system for measuring a feature of persons. The method includes defining the feature of persons being measured. The method further includes measuring values of data points from a sample of digital images comprising the persons, according to the defined feature by a first algorithm. The method further includes generating a distribution curve of the measured values. The method further includes standardizing the measured values by implementing a hyperbolic tangent function transformation.

15 Claims, 5 Drawing Sheets

METHOD AND SYSTEM FOR MEASURING A FEATURE OF PERSONS

TECHNICAL FIELD

The present disclosure relates generally to image processing techniques; and more specifically, to a method and a system for measuring a feature of persons.

BACKGROUND

With the advancement in image and video technology such as, camera, the number of digital objects such as, images have increased exponentially. This is because, more and more people may use cameras to capture full images, take selfies and/or record videos. The increasing digital images may need to be sorted in accordance with some features in the image. For example, the images may need to be arranged according to an age or a height of a person in the image. Such sorting may be done by providing some ranks to each image and then arranging the images according to their rank.

Conventionally, a number of algorithms are available that may be employed for ranking the image according to its features. Such algorithms may provide some values that may point towards the rank of the digital objects. However, the values obtained may not be human understandable and hence, the rank of the digital objects may not be interpreted easily. As an example, some pattern recognition software may provide an arbitrary number such as 0.00038 to an image; however, no expert explanation is associated therewith, like the numerical value for the image is 0.5 in a range of 0 to 1. The challenge is to connect a random technical measurement to human understandable notation, i.e., to transform an arbitrary raw numerical measure into a meaningful representative closed range value.

Therefore, in light of the foregoing discussion, there exists a need to overcome the aforementioned drawbacks associated with known tools for measuring a feature of persons.

SUMMARY

The present disclosure seeks to provide a method and a system for measuring a feature of persons. An aim of the present disclosure is to provide a solution that overcomes at least partially the problems encountered in prior art.

In a first aspect, the present disclosure provides a method for measuring a feature of persons. The method comprises: defining the feature of persons being measured; measuring values of data points from a sample of digital images comprising the persons, according to the defined feature by a first algorithm; generating a distribution curve of the measured values; standardizing the measured values, by implementing a hyperbolic tangent function transformation.

In a second aspect, the present disclosure provides a system for measuring a feature of persons. The system comprises: a memory configured to receive a sample of digital images comprising the persons; and a processor configured to: define the feature of persons being measured; measure values of data points from the sample of digital images comprising the persons, according to the defined feature by a first algorithm; generate a distribution curve of the measured values; and standardize the measured values, by implementing a hyperbolic tangent function transformation.

In a third aspect, the present disclosure provides a computer program for measuring a feature of persons comprising instructions which, when the computer program is executed by a system comprising a processor, cause the system to perform the method of present disclosure.

Embodiments of the present disclosure substantially eliminate or at least partially address the aforementioned problems in the prior art, and provide for reliable measurement of feature of persons. In particular, embodiments of the present disclosure implement non-linear monotonous transformation and applies smooth limiting that helps in obtaining meaningful representative values. Moreover, the embodiments of the present disclosure may also enable standardizing the measured values in a closed range of 0 to 1 without manually labelled ground truth values. This enables easy interpretation of the standardized measured values by humans.

Additional aspects, advantages, features and objects of the present disclosure would be made apparent from the drawings and the detailed description of the illustrative embodiments construed in conjunction with the appended claims that follow. It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION OF EMBODIMENTS

Figure 1:
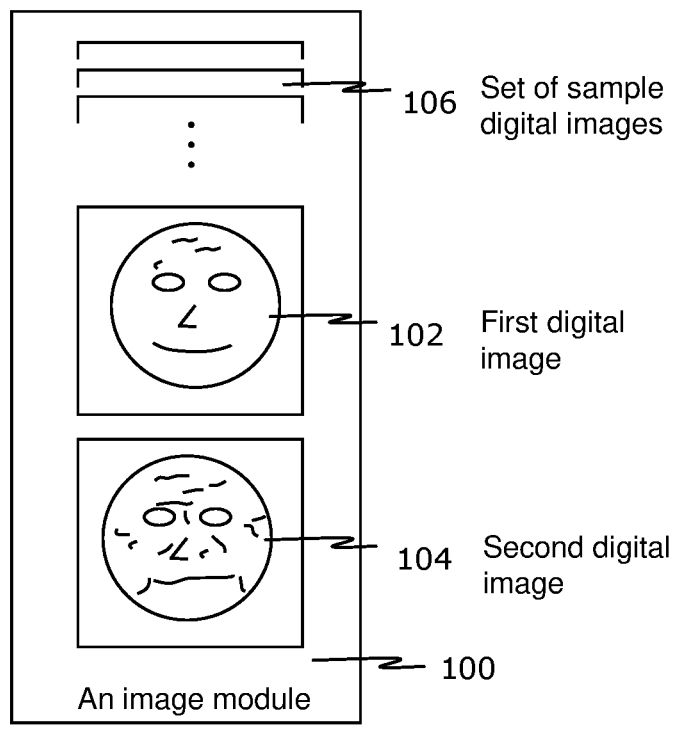
FIG. 1 is a block diagram illustration of an image module comprising sample digital objects, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In an aspect, the present disclosure provides a method for measuring a feature of persons, the method comprises defining the feature of persons being measured; measuring values of data points from a sample of digital images comprising the persons, according to the defined feature by a first algorithm; generating a distribution curve of the measured values; standardizing the measured values, by implementing a hyperbolic tangent function transformation.

In another aspect, the present disclosure provides a system for measuring a feature of persons, the system comprises a memory configured to receive a sample of digital images comprising the persons and a processor, wherein the processor is configured to: define the feature of persons being measured; measure values of data points from the sample of digital images comprising the persons, according to the defined feature by a first algorithm; generate a distribution curve of the measured values; and standardize the measured values, by implementing a hyperbolic tangent function transformation.

In an embodiment the system may comprise a memory, an image module, and a processor comprising a feature module, a first algorithm module, a distribution curve module and a standardization module. The memory is configured to receive a sample of digital images comprising the persons from the image module. The feature module is implemented to define the feature of persons being measured. The first algorithm module executes the first algorithm to measure values of data points from the sample of digital images comprising the persons. The distribution curve module is implemented to generate the distribution curve of the measured values. The standardization module is implemented to standardize the measured values by utilizing the hyperbolic tangent function transformation.

In embodiments of the present disclosure the image module comprises sample digital images comprising images of persons, e.g., the first digital image comprises the image of a face of a first person, and the second digital image comprises the image of the face of a second person, etc., defining the feature of persons being measured. The measured value of each of the sample digital images may be assigned by implementing a first algorithm suitable for measuring defined feature in a face of a person from a given digital image. The measure is assigned based on the determined number of defined features present in the image by the first algorithm.

Specifically, the method and system described in the present disclosure provides meaningful and efficient techniques for measuring the feature of persons. More specifically, the present disclosure discloses a first algorithm and a hyperbolic tangent function transformation that is easy and efficient for measuring the feature of persons. Beneficially, the method and the system for measuring the feature of persons may obtain a standardized measured value for that may be interpreted easily by humans.

The method for measuring the feature of persons comprises defining the feature of persons being measured. That is, the feature of persons being measured is defined based on the feature which is to be measured. It may be appreciated that the vast explosion of digital object may need to be sorted according to a number of factors. The sorting may be done effectively by assigning the standardized measured value according to the feature of persons. The feature of the persons can be e.g., but are not limited to, a height, a redness of a face, a redness of a skin, wrinkles of a face, a skin condition such as, acne, freckles and the likes, wherein the measured value is a numerical value corresponding to a height of a person; wrinkles, acne or other face conditions of the person, etc.

In an example, the feature of persons being measured is wrinkles. Herein, the "wrinkles" may be a small line, especially one on the skin of the face which one get as one grow older. The digital image having more wrinkles may be assigned a higher measured value such that the measured value of the digital image may give an idea of the percentage of freckles in the digital image. That is, the digital image of a person having a measured value of 0.8 may be concluded to have more wrinkles than the one having a measured value as 0.3. It may be appreciated that the measured value of the image, herein, may help in interpretation of how old the person is in a given digital image.

In another example, the feature of persons being measured is freckles. Herein, the "freckles" may be light brown patches on the skin caused due to excessive exposure to the sun. The digital images having more freckles may be assigned a higher measured value such that the measured value of the digital image may give an idea of the percentage of freckles in the digital image. That is, the digital image of a person having a measured value of 0.8 may be concluded to have more freckles than the one having a measured value as 0.3. It may be appreciated that the measured value of the image, herein, may help in interpretation of how exposed the person in a given digital image has been to the sun.

In still another example, the feature of persons being measured is scars. Herein, the "scars" may be marks on the skin and may be caused to a number of reasons, such as, but not limited to, wounds, burns and sores. The digital images having more scars may be assigned a higher measured value such that the measured value of the digital image may give an idea of the percentage of scars in the digital image. That is, the digital image of a person having a measured value of 0.8 may be concluded to have more scars than the one having a measured value as 0.3. It may be appreciated that the measured value of the image, herein, may help in interpretation that if the person in a given digital image has been involved in an accident or the like.

The method for measuring the feature of persons comprises measuring values of data points from a sample of digital images comprising the persons, according to the defined feature by a first algorithm. Herein, the measured value may be in the form of a number (i.e., numerical value) corresponding to the feature of persons. The sample digital images may be samples based on which the measured value for a target digital image may be obtained. It may be understood that each of the sample digital images in the set of sample digital images may belong to the single category. For example, in an embodiment, the sample digital image may be the image of the person's face and the measured value may be found according to a redness of the person's face. Herein, the set of sample digital images may comprise thousands of images of faces of different persons, e.g., 2000, 3000, 5000, 6000, 7000, 8000, 9000, 10000, 11000, 12000, 13000, 14000, 15000, 16000, 17000, 18000, or more. The "first algorithm" may be any suitable algorithm which is compatible and could be employed for measuring values of data points from the sample digital images, i.e., in this case, the redness of the person's face. For the given example of 10000 digital images as the sample digital images, the first algorithm is employed to measure the value of data points for each digital image so as to obtain a vector of 10000 elements.

Optionally, the digital images are frames of one or more videos. As may be appreciated, the videos are typically a collection of still images. Therefore, it may be possible to extract the necessary digital images by capturing one or more frames of a given video file.

The method comprises generating a distribution curve of the measured values. The distribution curve may depict how often the measured values may occur. The distribution curve may be e.g., normal, uniform, or unsymmetrical distribution shape or otherwise unbalanced and may require additional nonlinear shape correction to normalize it, e.g., exponential density function of people having acne. In an example, the height of the person is found and it needs to be determined, whether the person is tall or short or average. Herein, the sample digital images may be 10000 digital images of persons and the first algorithm may generally act as a ruler (e.g., by measuring the number of pixels or the like) that may be used to measure the height of each of the persons in the sample digital images. The obtained height may be referred to as the measured value. Once the height of each of the persons is determined, the distribution curve may be obtained by plotting those values by means of histogram. For human height, the distribution curve may look like a normal distribution. However, for some other measurement, the distribution curve may be highly unsymmetrical or otherwise unbalanced and may require additional nonlinear shape correction to make it more "normal". E.g., a skin condition such as acne does not affect everyone to a meaningful degree. Instead, some people suffer from it but most do not. So, the target distribution would have a lot of weight around low values (most people do not have acne) and then there are some higher values. This would look something like an exponential density function.

In an example the distribution curve illustrates probability of occurrence of the measured value of the sample digital images provided by the image module. The probability P(X), where X may be any measured value of the sample of digital images, is taken around the vertical axis and the measured values (X) is taken along the horizontal axis. If the measured values are more concentrated towards the origin and lesser towards the end points the maximum number of the digital images of the sample digital images in the image module have low measured values. That is, the maximum number of people in the digital images of sample digital images have less features (e.g., wrinkles) and only a few people have a pronounced number of measured features (e.g., wrinkles).

The shapes of the distribution curve may be one of a normal distribution, a uniform distribution and an exponential distribution. The uniform distribution may be the one where all measured values are equally probable. That is, when the measured value of each of the digital images in the sample digital images is the same, the distribution curve obtained may be uniform. The exponential distribution may be the one where the probability of occurrence of the measured values follows a decaying exponential pattern. Herein, a large number of measured values may be mostly close to zero with some exceptions. That is, herein, when the probability of occurrence of the measured values versus measured value graph is plotted, the distribution curve obtained is exponential distribution. The normal distribution may be the one where the probability of occurrence of the measured values follows a normal pattern. That is, when the probability of occurrence of the measured values of each of the digital images in the sample digital images versus measured values graph is plotted, the distribution curve obtained may be normal. Herein, the extremes of the measured values may be increasingly rare.

In the embodiments of normal distribution curve, the normal distribution curve is obtained by taking values (x) along the horizontal axis and the probability of occurrence of the value p(x)) along the vertical axis. The normal distribution has a higher weight around the centre point and has lesser weights towards end points. In the embodiments of uniform distribution curve, the uniform distribution is obtained by taking values (x) along the horizontal axis and the probability of occurrence (p(x)) along the vertical axis. In the uniform distribution the probability of occurrence (P(x)) is the same for each value. In the embodiments of exponential distribution curve, the exponential distribution is obtained by taking values (x) along the horizontal axis and the probability of occurrence (p(x)) along the vertical axis. The exponential distribution takes the shape of exponential function. Herein, the probability of occurrence (P(x)) is higher towards the origin and decreases exponentially towards the end value, in the exponential distribution curve.

Optionally, the method further comprises normalizing the distribution curve by implementing monotonous transformation. Herein, the processor is further configured to normalize the distribution curve by implementing monotonous transformation. Normalizing the distribution (i.e. correcting the shape of the distribution) when the transformation function is a nonlinear monotonous transformation function enables to balance the distribution shape closer to a normal distribution shape or to a uniform distribution shape. I.e., reshaping the distribution to a more sensible normal form. The monotonous transformation may be defined as a function that may transform a first data set to a second data set, such that the order of the numerical values is preserved. Herein, the monotonous transformation may be a non-linear monotonous transformation. That is, herein, the non-linear monotonous transformation function may transform each of the measured values in such a way that the order of the each of the measured values is preserved.

As discussed, the distribution curve may not be normal for all categories of the sample digital images. In the present embodiments, in case the distribution curve is undesirable, i.e., is not normal or even, the monotonous transformation enables obtain a desirable distribution curve. The desirable distribution curve obtained may be referred to as the transformed distribution curve. The desirable distribution curve that is apt for the sample of digital images may depend on the feature that is defined. Hence, the monotonous transformation to be used may depend on the defined feature for the sample digital images and may be learnt with experience. According to the defined feature for the sample digital images, a human input may be provided as to which monotonous transformation may be used.

In an implementation, it may be needed to determine whether the height of the person is average, low or medium. As discussed, the sample digital images comprising, for example, 10000 digital images of different persons may be provided. Herein, the height of each of the different persons may be the measured value of the respective digital image. Next, the distribution curve of the height of the 10000 different persons may be obtained. The human height may be normally distributed as most of the persons are quite average. There are only a few very tall and short people. Hence, a lot of height values may be around the average height. Therefore, the desired distribution curve for such a case may be the normal distribution.

In another implementation, it may be needed to determine whether the person has average, low or medium percentage of acnes. As discussed, the sample digital images comprising, for example, 10000 digital images of different persons may be provided. The numerical value depending on the acne condition of the person in each image may be obtained. Next, the distribution curve of the acne condition of the persons in the sample digital images may be obtained. The skin condition such as the acne does not affect everyone to a meaningful degree. Instead, some people suffer from it but most do not. So intuitively, the desired distribution curve would have a lot of weight around low values as most people do not have acne. There may be some people having higher values. That is, the large number of people may have lower numerical value. Hence, the probability of occurrence of the lower numerical values may be high and as the numerical value increases, the probability of its occurrence may decrease. Therefore, the desired distribution curve may look like the exponential distribution. Hence, the human input may provide the monotonous transformation as one that may transform the probability distribution function into the exponential distribution.

In still another implementation, it may be needed to determine whether the person has average, low or medium percentage of wrinkles. As discussed, the sample digital objects comprising, for example, 10000 digital images of different persons may be provided. The measured value for each of the digital images may be obtained according to the percentage of wrinkles of the person in the digital image. Next, the distribution curve of the above measured values may be obtained. If the different persons are in the age group of 20-22 years, the desired distribution curve drawn on the basis of wrinkles may be the uniform distribution. Hence, in such cases, the human input may provide the monotonous transformation as the one that may transform the distribution curve into the uniform distribution. However, if the age group of the different persons are not restricted, the desired distribution curve may be normal distribution. Hence, the appropriate monotonous transformation must be chosen which may be derived based on experimentation and experience.

It may be contemplated that the monotonous transformation may not always be necessary. For the cases, such as the height measurement problem as discussed, in one of the preceding paragraphs, where the distribution is normal or even, the monotonous transformation may not be needed.

In an embodiment, the monotonous transformation comprises a natural logarithmic function. The natural logarithmic function is defined by, an equation, $y=\ln(x)$ wherein, y is the natural logarithmic function on a variable x. The natural logarithmic function may not require any parameters and may transform the undesirable distribution curve to the normal distribution. For example, a probability distribution function (p(n)) on the measured values (n) may be transformed by plotting the graph of the transformed values (ln(p(n))) versus the measured values (n). Hence, for the cases where the desired distribution curve is the normal distribution, the human input may provide the natural logarithmic function. It may be contemplated that the transformed values obtained by a natural logarithmic function may lie between $-\infty$ to $+\infty$.

It may be appreciated that the normal distribution is not limited in its range; that is, it can output any values in the range of $-\infty$ to $+\infty$. The normal distribution naturally and theoretically may have such range from negative infinity to positive infinity. While measuring the height of a person, this may not be a practical concern. However, in order to make sure that the range of the transformed values is limited, a hyperbolic tangent function transformation may be used to standardize the measured values with absolute certainty.

The method comprises standardizing the measured values, by implementing a hyperbolic tangent function transformation. Standardizing the measured values enables to get limited closed range e.g. [0,1]. The hyperbolic tangent function transformation may be defined by the equation $y=\tan h(X)$, where, X is the variable whose hyperbolic tangent needs to be obtained and y is the hyperbolic tangent of X. The tan h(X) may cap the values from $-\infty$ to $+\infty$ into the closed range [−1,1]. The tan h(X) function may have a linear segment in the middle near zero and may asymptotically approach −1 with negative input and conversely approach 1 with higher positive values.

Optionally, standardizing the measured values comprises implementing a two-parameter hyperbolic function comprising parameters h, hv. That is, for standardizing, the processor is further configured to implement the two-parameter hyperbolic function comprising parameters h, hv. The two parameters used to implement the two-parameter hyperbolic function are h and hv. Herein, 'h' may be an extreme measured value or high end measured value from the unnormalized distribution. For example, for measurement of height 'h' may be 200 cm. The 'hv' may be defined as a set point of extremity corresponding to 'h' (in the tan h function along x axis). The 'hv' may depict how extreme 'h' is. Typically, 'h' may be taken as 3 which may be a good pick. The two-parameter hyperbolic function assumes zero low end values and specifies only the high-end normalization.

Optionally, standardizing the measured values comprises implementing a four-parameter hyperbolic function comprising parameters l, lv, h, hv. That is, for standardizing, the processor is further configured to implement the four-parameter hyperbolic function comprising parameters l, lv, h, hv. Herein, 'l' may be defined as a low point in regular tan h(x) shape. Also, 'lv' may be the measured low value that hits the low point in regular tan h(x) shape. That is, the 'lv' may be a low limit of the measured values. Further, 'h' may be defined as a high point in regular tan h(x) shape. And, 'hv' may be the measured high value that hits the high point. That is, 'hv' may be a top limit of the measured values. It may be contemplated that the 4-parameter hyperbolic function is, typically, more powerful and may generally be applied in any such situation. The 4-parameter hyperbolic function is capable of fitting the normal 'tan h' shape to any raw number range. The middle part of the 'tan h' shape preserves the input data shape since it is linear. Only the low and high tail sections are modified drastically. Herein, the additional parameters control the range of the input so it fits the tan h shape and to return range [0 1] instead. Hence, the 4-parameter hyperbolic function is generally preferred over the 2-parameter hyperbolic function for the embodiments of the present disclosure. I.e. l/h are in the tan h(x) axis space and lv/hv are the raw unnormalized values.

It may be appreciated that, if instead of using the hyperbolic tangent function transformation the low limit and top limit of the measured values are capped by hard caps, comparability between the measured values may be lost. For example, in an example implementation, the low limit of the measured values may be set as −100 and the top limit of the measured values may be set as +100. If the low limit of −100 is hard capped as −1 and the top limit of 100 is hard capped as +1, then the measured values 101 and 120 may both be limited to 100. In the present implementations, this may be avoided by using the hyperbolic tangent function transformation. The hyperbolic tangent function transformation may have asymptotic saturation towards the limit value but never actually reaches the limit. Herein, the range may be open on both ends as −∞ may be limited to −1 and +∞ may be limited to +1. That is, the hyperbolic tangent function transformation only modifies drastically the low and high tail sections. However, in case the measured values are known to be in a said range, the limits of the hyperbolic tangent function transformation may be defined accordingly. For example, in an implementation, in the measurement of the height of the person, it may be appreciated that the height lies in the range of 63 cm to 292 cm. Hence, the hyperbolic tangent function transformation herein, may limit 63 cm to −1 and 292 cm to +1.

In an embodiment, the standardized measured values may be mapped to the closed range of 0 to 1. As discussed, the standardized measured values when limited by implementing the said hyperbolic tangent transformation may be in the closed range of −1 to 1. However, for better interpretation the closed range −1 to 1 may be mapped to the closed range 0 to 1. This may be done by linear means or a normalization technique. In an embodiment, this may be done by controlling the parameters l, lv, h, hv, while using the four-parameter hyperbolic function. For example, 'l' may set to 0 and also 'hv' may be set 0. For example, for the height measurement cases the four-parameter hyperbolic tangent function may be defined in such a way that the standardized measured value output follows a standard where 0.5 is the average and 175 cm is mapped to 0.5. In measurement of height, 0 is a standardized measured value that is lowest. Hence, the measured value 140 cm may be mapped to the standardized value 0.03. This may be done by fitting the four-parameter hyperbolic tangent function so that it can apply for any "raw" range of measured values and may provide standardized values in the range of 0 to 1.

In another embodiment, the 4-parameter hyperbolic function may be used to limit the measured values in the range of −1 to 1 in order to obtain the standardized measured values and then the normalization technique may be performed on the standardized measured values. Herein, the normalization technique is a process of scaling the values of the variables between a certain range. Generally, the range may be taken as 0 to 1. There are a number of ways to perform the normalization. Typically, the normalization is done by a formula $$X_{new} = \frac{X - X_{min}}{X_{max} - X_{min}}$$

where, X is the original value of the variable, $X_{new}$ is the new value of the variable X obtained after normalization, $X_{min}$ is the minimum value of the variable X and $X_{max}$ is the maximum value of the variable X. The mapping of the measured values to the closed range of 0 to 1 may also be done by performing the linear transform and the hyperbolic tangent function results together. Thus, it may be appreciated that, in the present embodiments, the hyperbolic tangent function transformation may cap values from negative to positive infinities into a closed range [−1, 1]. The additional parameters control the range of the input so it fits the tan h shape and to return range [0, 1] instead.

Optionally, the method further comprises comparing the standardized values of the data points with persons having a second feature in common, the standardized values of the data points with a second sample of digital images comprising similar data points, or the standardized values of the data points with the second sample of digital images comprising data points having a second feature. Herein, the processor is further configured to compare the standardized values of the data points with persons having a second feature in common, the standardized values of the data points with a second sample of digital images comprising similar data points, or the standardized values of the data points with the second sample of digital images comprising data points having a second feature. This enables to analyze is this result average, low, high or something in between, e.g., is this person tall or short, compared to the larger sample or other sample having similar data (e.g., people in general). It may be appreciated that the second feature, as used herein, may be similar to the defined feature for the sample of digital images.

In an embodiment, the standardized values of the data points may be compared with persons having the second feature in common. Herein, a target digital image may be given as an input. The target digital image is the one that needs to be compared. It may be understood that the target digital object may belong to the same category as the sample of digital images. That is, for example, if the defined feature is the wrinkles of face of the person, the sample digital images may comprise pluralities of images of face of different persons and the target digital image may also be the digital image of the face of the person whose second feature needs to be compared, with the second feature herein, being the wrinkles in the face of the person. Once, the target digital image is received, the first algorithm may take the target digital image as the input and may provide the measured value according to the second feature. Next the standardized measured value for the target digital image may be obtained by employing the hyperbolic tangent function transformation. The standardized measured values of the digital target image may then be compared with the standardized measure value of data points so to deduce the percentage of feature. For example, the comparison may provide a result as an average, a low, a high or something in between. For height measurement cases, the comparison may give an idea of whether the person in the target digital image is tall, short or average compared to the persons in the sample of digital images.

In another embodiment, the standardized values of the data points may be compared with the second sample of digital images comprising similar data points. That is, herein, instead of inputting a single target digital image, the second sample of digital images comprising a plurality of target digital images may be given as the input. The measured value for each of the digital images in the second sample of digital images may be found individually by using the first algorithm. Next, the standardized measured value may be found for each of the digital images in the second sample of digital images by implementing the hyperbolic tangent function transformation. Finally, each of the digital images in the second sample of digital images, may be compared with the standardized values of the data points in order to obtain the result for the second sample of digital images as the average, the low, the high or something in between. That is, if the standardized values of the second sample of digital images when compared with the standardized values of the sample of digital images is average, the result obtained may be average.

In still another embodiment, the standardized values of the data points may be compared with the second sample of digital images comprising data points having a second feature. As discussed, in the preceding paragraphs, the second feature is generally the same as the defined feature. Herein, the second sample of digital images may be given as the input and the standardized measured value for each of the image in the second sample of digital images may be obtained by using the first algorithm and the hyperbolic tangent function transformation. Next, the standardized measured value for each of the image in the second sample of digital images may be compared with the standardized values of the data points in order to obtain the result as the average, the low, the high or something in between.

In an embodiment, the standardized measured values of the target digital image may be mapped to the closed range in order to obtain a representative rank value for the target digital image by implementing a second algorithm. Herein, the standardized measured value may be mapped to obtain the representative rank value by implementing the second algorithm. The second algorithm is an algorithm that helps in deriving the representative rank value. For example, in an embodiment, the standardized measure is 0.8 and the closed range is 0 to 1. The representative rank value may thus be 80 percent. In another embodiment, the representative rank value may give a number from 1 to 100 by mapping the limited transformed value to the closed value. For example, when the limited standardized measure is 0.75, the representative rank value may be obtained as 75.

The method and the system measuring the feature of persons of the present disclosure may be understood with the help of the following example. In an embodiment, the measured values for the sample digital images may be a vector (d), such that d=[2.7, 7.4, 20.1]. The distribution curve of the above sample digital images may be obtained by means of the histogram approximation. The distribution curve may be unsymmetrical and the density of the sample digital images may not be even or normal, both of which are undesirable. Hence, the monotonous transformation such as the natural logarithmic function may be employed in order to obtain the desired curve. The natural logarithmic function gives [1.0, 2.0, 3.0]. Next the parameters of the four-parameter hyperbolic function may be found. The logic is to provide the top and bottom value combined with their "extremity". Herein, the extremity may refer to how rare, the said top or bottom values are supposed to be. From the values [1.0, 2.0, 3.0], the top limit may be taken as 1.0 and the bottom limit may be taken as 3.0. The extremities may be taken as −1 and 1. That is, standardized values may be limited to the closed range −1 to 1. In an example a "MatLab" code defining the 4-parameter hyperbolic function may be written as explained below:

```
//
% x - input data
% l - low point in regular tanh(x) shape
% lv - value that hits the low spot
% h - high point in regular tanh(x) shape
```

```
% hv - value that hits the high spot
function a2=tanhNonlinearity2(x,l,lv,h,hv)
z = (h−l*hv/lv)/(1−hv/lv);
a2 = (tanh( x/lv*(1−z) + z )+1)*.5;
end
//
```

After running the 4-parameter hyperbolic function tanhNonlinearity2(ln(d),−1,1,1,3), the obtained transformed values may be limited and an output may be obtained as [0.12, 0.50, 0.88] which is standardized. Next, the target digital image belonging to the said single category of sample of digital images may be passed through the first algorithm to assign the measured value. The measured value say, v=31 of the target digital image may then be processed through tan h(x) function, which may give the standardized value as 0.95 in this case. Tan h(x) functions are limited to [−1, 1] output range. The 'h' and 'hv' parameters for example connect the unnormalized value 'hv' to the tan h shape location in x-axis 'h'. Value h=1 (looking at the function shape) happens to be near the linear part's end so it is a convenient "moderately extreme" value (output is 0.76, i.e., tan h(1)=0.76). Similarly, e.g. h=2 is already close to the asymptotic part and thus will output close to the maximum (saturation); tan h(2)=0.96. So, if the raw value, which needs the normalization, is 200 cm and then by choosing over h=1 or h=2 would imply how rare 200 cm presumably is. 1 is high end but still within the linear range, 2 is already exceptional and will be soft-limited heavily by the tan h shape.

Although the present disclosure has been described in terms of "sample of digital images" however, it may be appreciated that the teachings of the present disclosure may be applied to any type of digital object, such as, but not limited to, audios, videos, texts and the likes. It may be further noted that, in addition to measuring the feature of persons, the teachings of the present disclosure may be employed for measuring the feature of other objects such as, but not limited to, count of trees, buildings and vehicles.

The system and the method enable the feature of persons to measure quickly and effectively. Moreover, the implementation of the monotonous transformation helps to transform the distribution curve to more sensible form. Furthermore, the mapping of measured values that are arbitrary and raw into the standardized value in the closed range of 0 to 1 without manually labelled ground truth values enables straightforward interpretation by humans.

DETAILED DESCRIPTION OF THE DRAWINGS

Referring to FIG. 1, illustrated is a block diagram illustration of an image module 100 comprising a set of sample digital images 106, in accordance with an embodiment of the present disclosure. As shown, the set of sample digital images 106 comprises images of persons, including a first digital image 102 and a second digital image 104. Herein, the first digital image 102 comprises the image of a face of a first person, and the second digital image 104 comprises the image of the face of a second person. The defined feature herein, is the wrinkles on the face. As shown, the first person in the first digital image 102 has lesser wrinkles than the second person in the second digital image 104. A measured value to each of the sample digital images may be assigned by implementing a first algorithm suitable for measuring wrinkles in a face of a person from a given digital image. The measured value for the first digital image 102 may be determined as, for example, 25.3 and for the second digital image 104 may be determined as, for example, 7508.6. Herein, the measure is assigned based on the determined number of wrinkles present in the image by the first algorithm.

Figure 2:
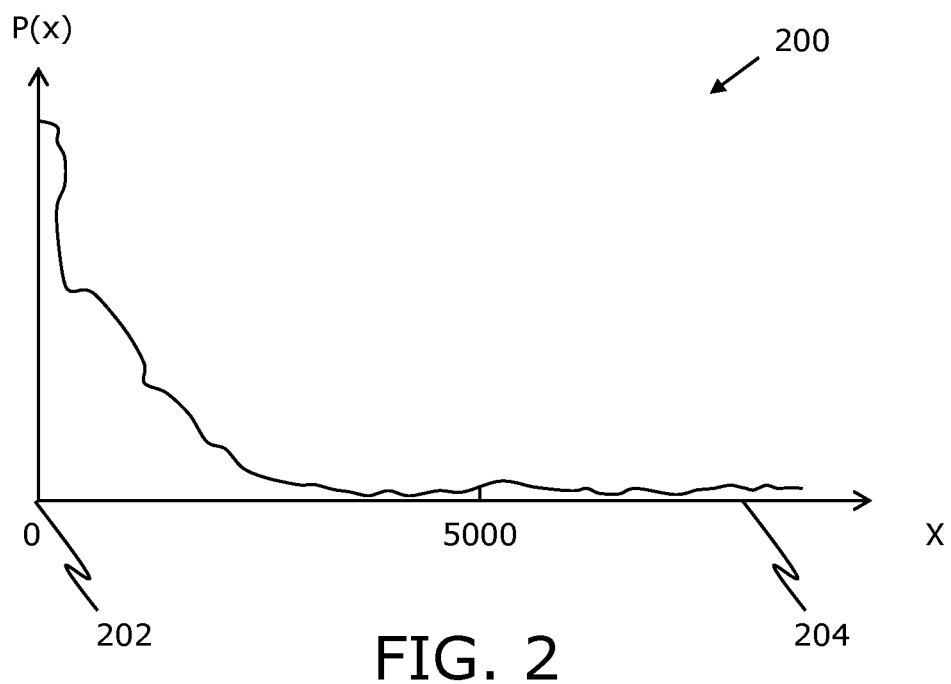
FIG. 2 is a graphical illustration of an exemplary distribution curve, in accordance with an embodiment of the present disclosure.

Referring to FIG. 2, illustrated is a distribution curve 200 for the measured values of FIG. 1, in accordance with an embodiment of the present disclosure. That is, the distribution curve 200 gives probability of occurrence of the measured value of FIG. 1. Herein, the probability (P(X), where X may take any measured value of FIG. 1) is taken around the vertical axis and the measured values (X) is taken along the horizontal axis. As shown, the measured values are more concentrated towards the origin 202 and lesser towards the end points such as point 204. This implies the maximum number of the digital images of the sample digital images in the image module 100 of FIG. 1 have low measured values. That is, the maximum number of people in the digital images of sample digital images have less wrinkles and only a few people have a pronounced number of wrinkles.

Figure 3A:
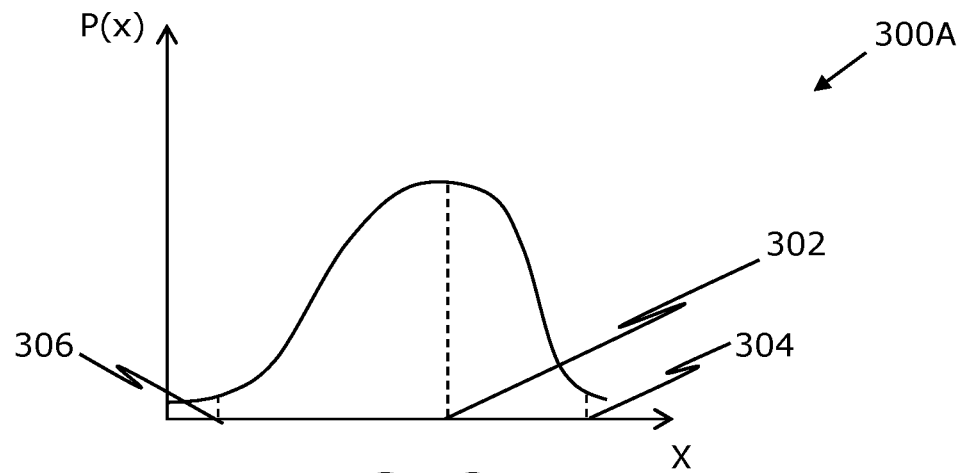
FIG. 3A is a graphical illustration of an exemplary normal distribution, in accordance with an embodiment of the present disclosure.

Referring to FIG. 3A, illustrated is a normal distribution curve 300A, in accordance with an embodiment of the present disclosure. The normal distribution curve is obtained by taking values (x) along the horizontal axis and the probability of occurrence of the value p(x)) along the vertical axis. As shown, the normal distribution has a higher weight around the centre point 302 and has lesser weights towards end points 304 and 306, in the normal distribution curve 300A.

Figure 3B:
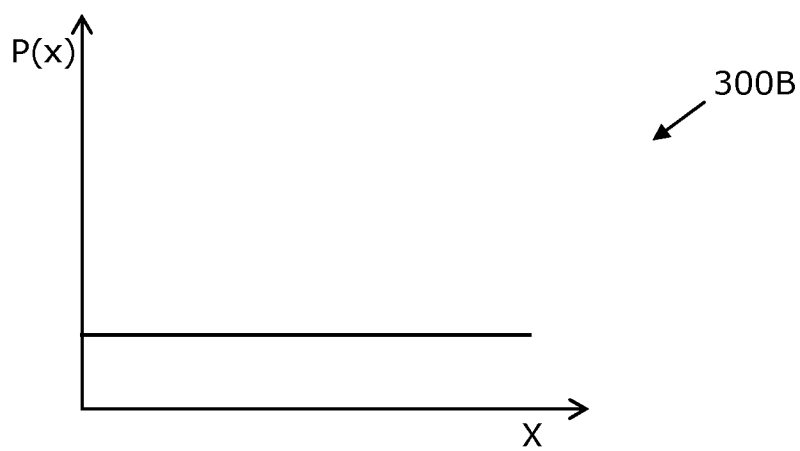
FIG. 3B is a graphical illustration of an exemplary uniform distribution curve, in accordance with an embodiment of the present disclosure.

Referring to FIG. 3B, illustrated is a uniform distribution curve 300B, in accordance with an embodiment of the present disclosure. The uniform distribution is obtained by taking values (x) along the horizontal axis and the probability of occurrence (p(x)) along the vertical axis. As shown, the uniform distribution is uniform that is, the probability of occurrence (P(x)) is the same for each value, in the uniform distribution curve 300B.

Figure 3C:
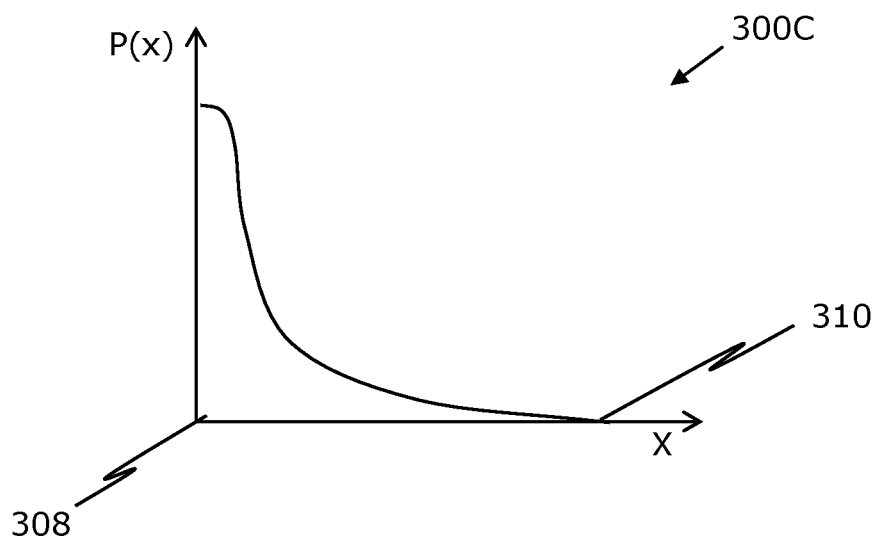
FIG. 3C is a graphical illustration of an exemplary exponential distribution curve, in accordance with an embodiment of the present disclosure.

Referring to FIG. 3C, illustrated is an exponential distribution curve 300C, in accordance with an embodiment of the present disclosure. The exponential distribution is obtained by taking values (x) along the horizontal axis and the probability of occurrence (p(x)) along the vertical axis. As shown, the exponential distribution takes the shape of exponential function. Herein, the probability of occurrence (P(x)) is higher towards the origin 308 and decreases exponentially towards the end value 310, in the exponential distribution curve 300C.

Figure 4:
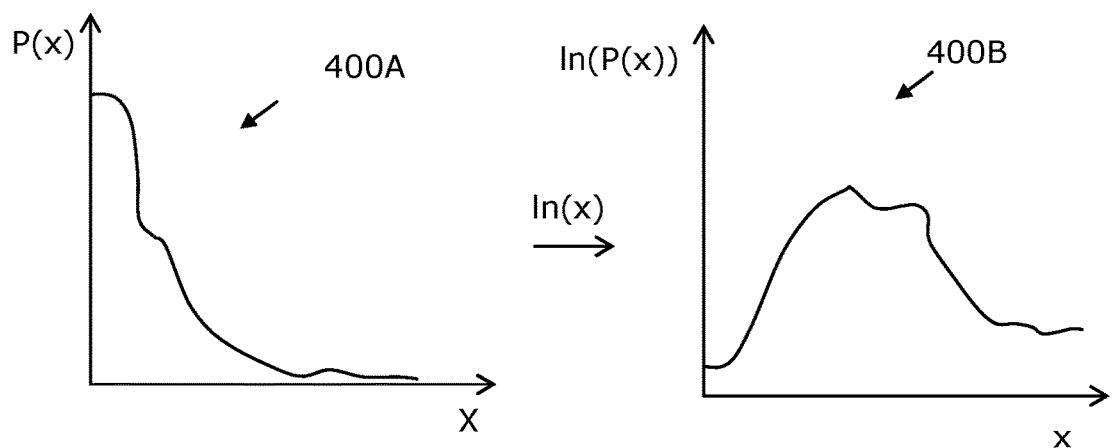
FIG. 4 illustrates the implementation of monotonous transformation, in accordance with an embodiment of the present disclosure.

Referring to FIG. 4, illustrated is an example of reshaping the undesirable distribution curve 400A to a more sensible normal form by implementing monotonous transformation and to obtain desired normal distribution curve 400B.

Figure 5A:
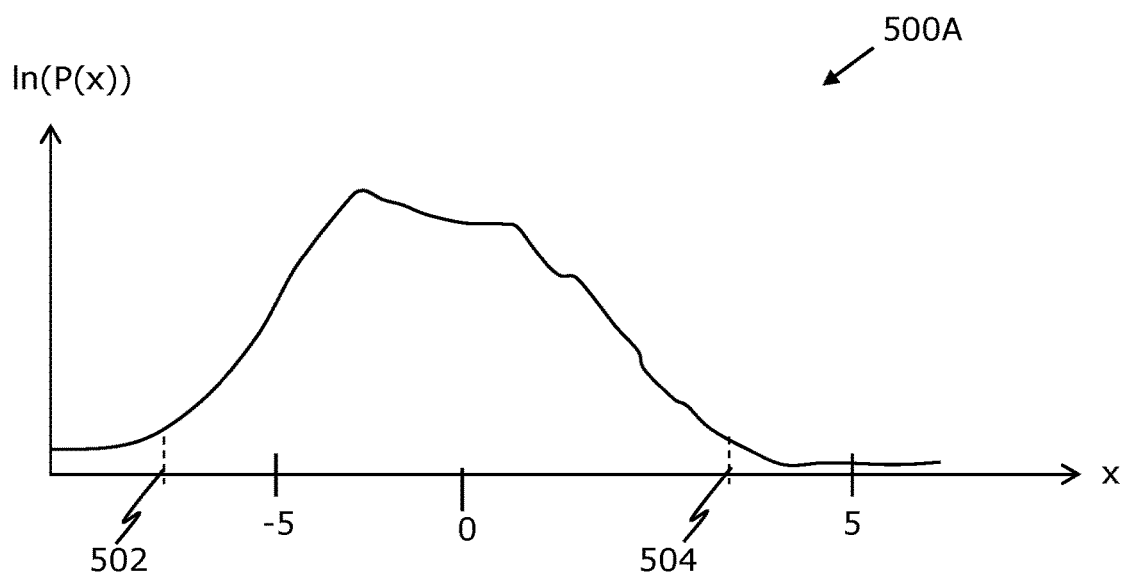
FIG. 5A is a graphical illustration of an exemplary desired distribution curve, in accordance with an embodiment of the present disclosure.

Referring to FIG. 5A, illustrated is a desired distribution curve 500A, in accordance with an embodiment of the present disclosure. Herein, the measured values obtained by taking the natural logarithmic function (ln(p(x)) may be taken along the vertical axis and the measured values (x) may be taken along the horizontal axis. The desired distribution curve 500A takes up the measured values from −8 to +3. The point 502 denotes the numerical value of low value −8 and the point 504 denotes the numerical high value of +3.

Figure 5B:
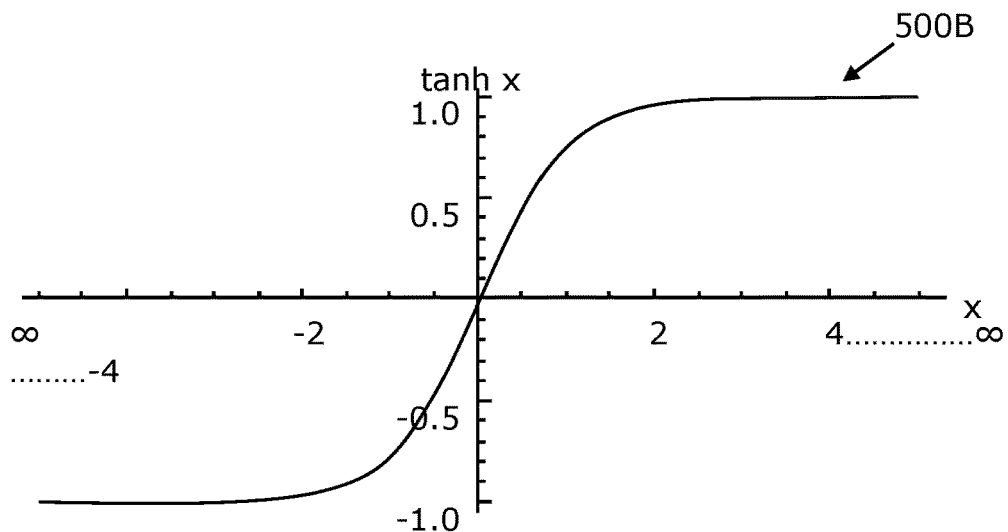
FIG. 5B is a graphical illustration of an exemplary hyperbolic tangent function transformation, in accordance with an embodiment of the present disclosure.

Referring to FIG. 5B, illustrated is a hyperbolic tangent function transformation 500B, in accordance with an embodiment of the present disclosure. As shown, the hyperbolic tangent function transformation 500B is nonlinear and takes values from −1 to +1.

Figure 5C:
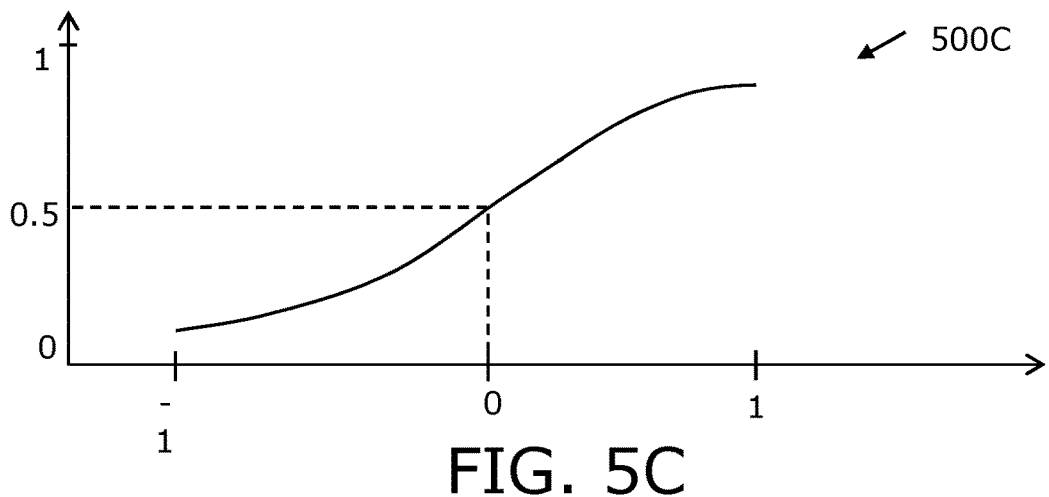
FIG. 5C is a graphical illustration of the hyperbolic tangent function transformation used for limiting obtained measured values of FIG. 5A, in accordance with an embodiment of the present disclosure.

Referring to FIG. 5C, illustrated is a hyperbolic tangent function transformation 500C used for limiting the obtained measured values of FIG. 5A, in accordance with an embodiment of the present disclosure. The hyperbolic tangent function transformation 500C is used for limiting the obtained measured values of FIG. 5A to a closed range, herein a closed range of 0 to 1.

Figure 5D:
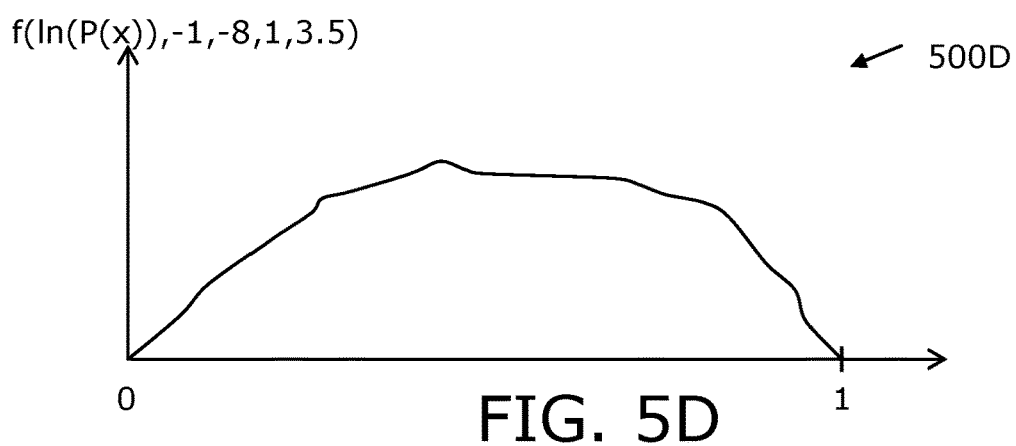
FIG. 5D is a graphical illustration of a limited distribution curve, in accordance with an embodiment of the present disclosure.

Referring to FIG. 5D, illustrated is limited distribution curve 500D, in accordance with an embodiment of the present disclosure. Herein, the limited distribution curve 500D is obtained by limiting the obtained measured values of FIG. 5A with the hyperbolic tangent function transformation 500C of FIG. 5C. As shown, the limited distribution curve 500D is normal and is in the closed range of 0 to 1.

Figure 6:
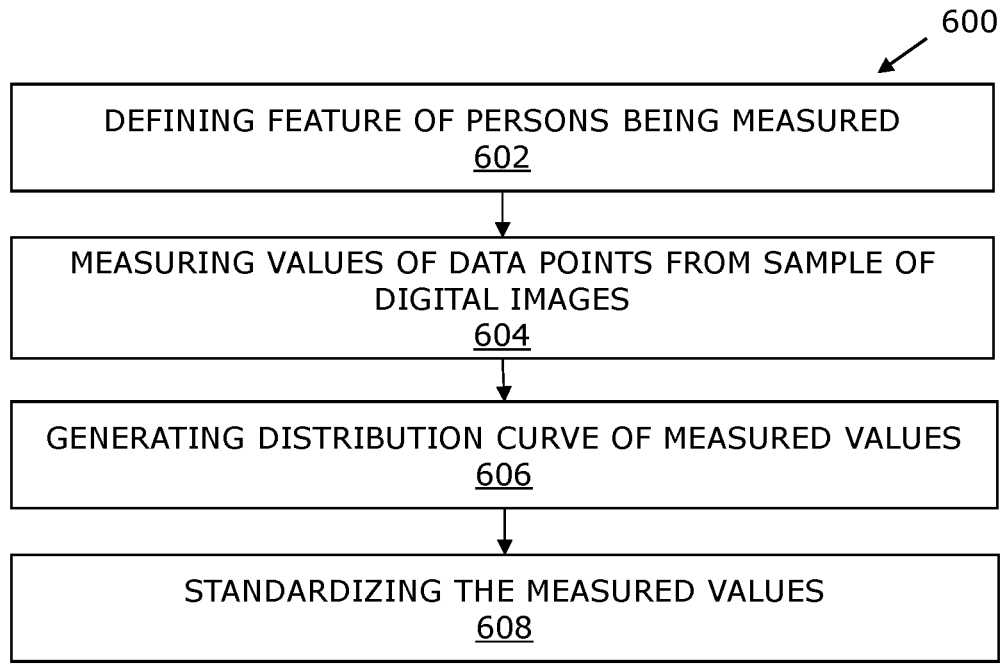
FIG. 6 is a flowchart depicting steps of a method for measuring a feature of persons, in accordance with an embodiment of the present disclosure.

Referring to FIG. 6, illustrated is a flowchart 600 depicting steps of a method for measuring the feature of persons, in accordance with an embodiment of the present disclosure. At step 602, the feature of persons being measured is defined. At step 604, values of data points from the sample of digital images comprising the persons are measured according to the defined feature by the first algorithm. At step 606, the distribution curve of the measured values is generated. At step 610, the measured values are standardized.

Figure 7:
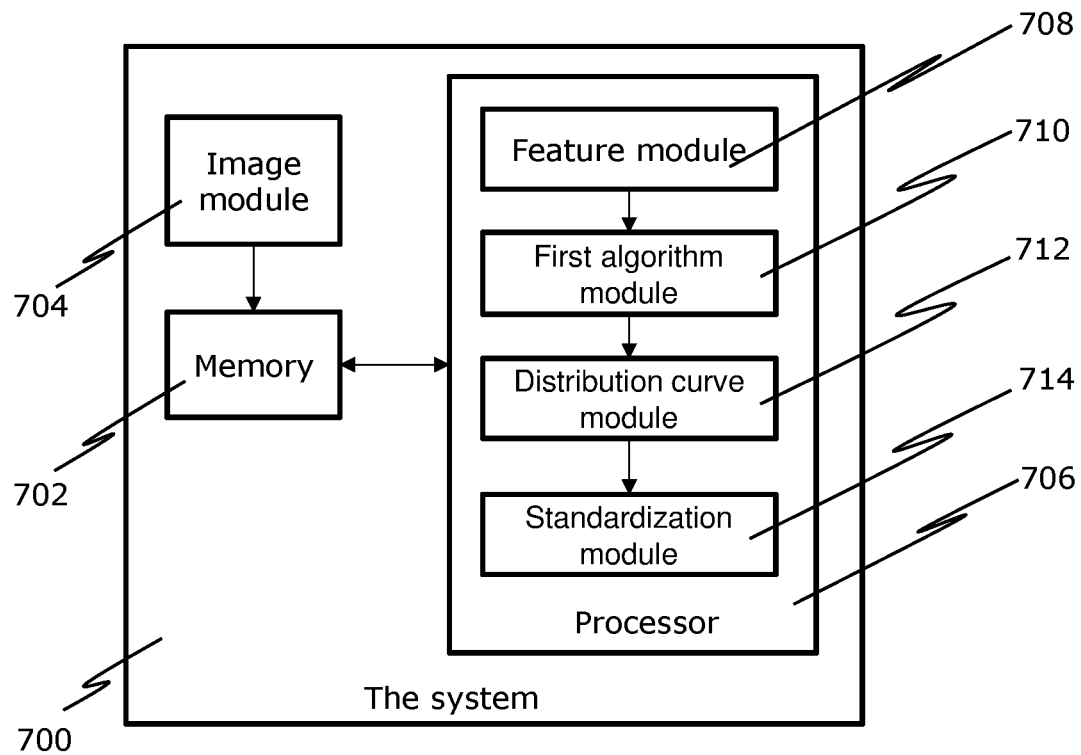
FIG. 7 illustrates a system for measuring a feature of persons, in accordance with an embodiment of the present disclosure.

Referring to FIG. 7, illustrated is a simplified block diagram of a system 700 for measuring a feature of persons, in accordance with an embodiment of the present disclosure. The system 700 comprises a memory 702, an image module 704, and a processor 706. The processor 706 further comprises a feature module 708, a first algorithm module 710, a distribution curve module 712 and a standardization module 714. The memory 702 is configured to receive a sample of digital images comprising the persons from the image module 704. The feature module 708 is implemented to define the feature of persons being measured. The first algorithm module 710 executes the first algorithm to measure values of data points from the sample of digital images comprising the persons. The distribution curve module 712 is implemented to generate the distribution curve of the measured values. The standardization module 714 is implemented to standardize the measured values by utilizing the hyperbolic tangent function transformation.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for measuring a feature of persons, the method comprising:
defining the feature of persons being measured;
measuring values of data points from a sample of digital images comprising the persons, according to the defined feature by a first algorithm;
generating a distribution curve of the measured values;
determine if the distribution curve is normal or even;
normalize the distribution curve by implementing monotonous transformation if it is determined that the distribution curve is not normal or even; and
standardizing the measured values, by implementing a hyperbolic tangent function transformation.

2. The method according to claim 1, wherein standardizing comprises implementing a two-parameter hyperbolic function comprising parameters h, hv.

3. The method according to claim 1, wherein standardizing comprises implementing a two-parameter hyperbolic function comprising parameters h, hv.

4. The method according to claim 1, wherein standardizing comprises implementing a four-parameter hyperbolic function comprising parameters l, lv, h, hv.

5. The method according to claim 1, wherein standardizing comprises implementing a four-parameter hyperbolic function comprising parameters l, lv, h, hv.

6. The method according to claim 1, wherein the method further comprises comparing:
   the standardized values of the data points with persons having a second feature in common,
   the standardized values of the data points with a second sample of digital images comprising similar data points, or
   the standardized values of the data points with the second sample of digital images comprising data points having a second feature.

7. The method according claim 1, wherein the digital images are frames of one or more videos.

8. A system for measuring a feature of persons, the system comprises a memory configured to receive a sample of digital images comprising the persons and a processor, wherein the processor is configured to:
   define the feature of persons being measured;
   measure values of data points from the sample of digital images comprising the persons, according to the defined feature by a first algorithm;
   generate a distribution curve of the measured values;
   determine if the distribution curve is normal or even;
   normalize the distribution curve by implementing monotonous transformation if it is determined that the distribution curve is not normal or even; and
   standardize the measured values, by implementing a hyperbolic tangent function transformation.

9. The system according to claim 8, wherein, for standardizing, the processor is further configured to implement a two-parameter hyperbolic function comprising parameters h, hv.

10. The system according to claim 8, wherein, for standardizing, the processor is further configured to implement a four-parameter hyperbolic function comprising parameters l, lv, h, hv.

11. The system according to claim 8, wherein, for standardizing, the processor is further configured to implement a two-parameter hyperbolic function comprising parameters h, hv.

12. The system according to claim 8, wherein, for standardizing, the processor is further configured to implement a four-parameter hyperbolic function comprising parameters l, lv, h, hv.

13. The system according to claim 8, wherein the processor is further configured to compare
   the standardized values of the data points with persons having a second feature in common,
   the standardized values of the data points with a second sample of digital images comprising similar data points, or
   the standardized values of the data points with the second sample of digital images comprising data points having a second feature.

14. The system according to claim 8, wherein the digital images are frames of one or more videos.

15. A computer program product comprising a non-transitory computer readable medium configured with machine-readable instructions for measuring a feature of persons, wherein when the machine readable instructions of the computer program are executed by a system comprising a processor, the system is configured to
   measure values of data points from a sample of digital images comprising the persons, according to a defined feature by a first algorithm;
   generate a distribution curve of the measured values;
   determine if the distribution curve is normal or even;
   normalize the distribution curve by implementing monotonous transformation if it is determined that the distribution curve is not normal or even; and
   standardize the measured values by implementing a hyperbolic tangent function transformation.

* * * * *